Aug. 15, 1961     J. H. ARFF     2,995,857

FISHING LURE

Filed April 20, 1959

INVENTOR
John H. Arff

BY

AGENT

United States Patent Office 2,995,857
Patented Aug. 15, 1961

2,995,857
FISHING LURE
John H. Arff, Portland, Oreg., assignor to A-Lure, Inc.,
a corporation of Oregon
Filed Apr. 20, 1959, Ser. No. 807,542
4 Claims. (Cl. 43—42.34)

This invention relates generally to fishing equipment and more particularly to line attached hook carrying means for causing a fish to strike the hook.

It is a principal object of this invention to provide a plug type of imitation live bait lure of relatively small size and great strength which can be used with appropriate size hooks to catch fish over a wide range of sizes and species.

It is a second object to provide such a lure having a desired fish luring action when used with any of the commonly used fishing methods such as casting, spinning, trolling, or still fishing.

It is a third object to provide such a lure which between its line and hook attachment positions is stronger than the line with which it would be used.

It is a fourth object to provide a lure which will tend to slip from the bite of a striking fish to direct the hook into snagging contact therewith.

It is a fifth object to provide a lure of such shape as to imitate the natural appearance and action of an active live bait.

How these and other objects are attained will be understood from the following description referring to the attached drawing in which FIG. 1 is a view in side elevation of the lure of this invention together with an attached triple hook with which it would be used.

Like numerals refer to like parts in the several figures of the drawing.

Figure 1:
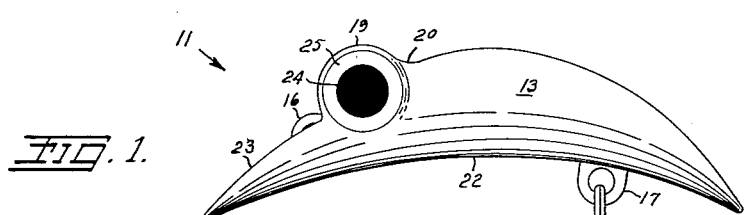
Figure 2:
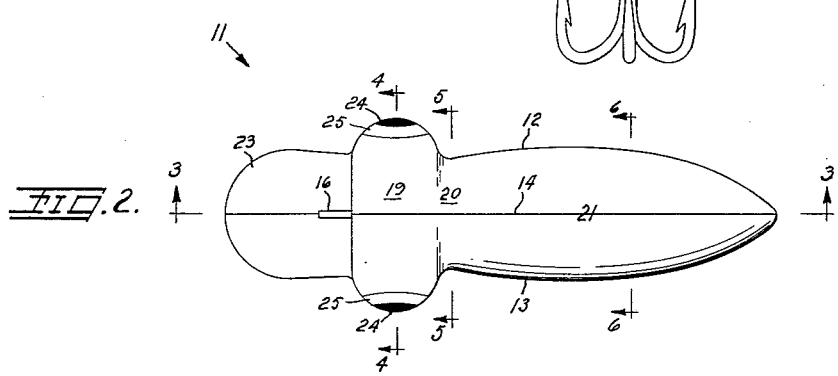
FIG. 2 is a top plan view of the lure of FIG. 1.
Figure 3:
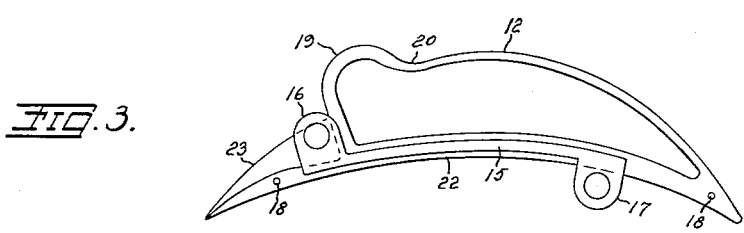
FIG. 3 is a view in vertical section along the line 3—3 of FIG. 2.
Figure 4:
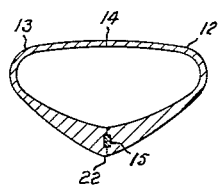
FIG. 4 is a view in transverse section along the line 4—4 of FIG. 2.
Figure 5:
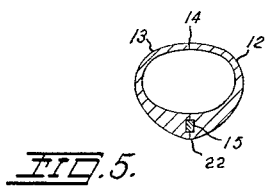
FIG. 5 is a view in transverse section along the line 5—5 of FIG. 2.
Figure 6:
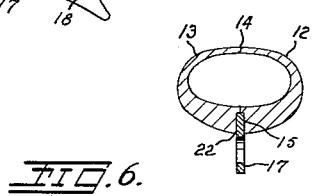
FIG. 6 is a view in transverse section along the line 6—6 of FIG. 2.

Referring now to the drawing, it is seen that the lure 11 of this invention comprises molded plastic respective right and left hand body halves 12 and 13 adhesively secured together along the plane 3—3, or line 14, of FIG. 2 or the line 14 of FIGS. 4 to 6.

As shown in FIGS. 3 to 6, the mating surfaces 14 of body halves 12 and 13 are formed with grooves sunk therein for receiving the keel strap 15 and with pits and pins 18 with which the body halves 12 and 13 are kept in register while the adhesive material with which they are united is curing.

Keel strap 15 is formed as shown at its head end with upwardly extending line attachment lug 16 and at its tail end with downwardly extending hook attachment lug 17.

When the body halves 12, 13 are assembled with keel strap 15 to form lure 11, the body is seen to have a downwardly concave outline along the longitudinal centerline of its keel and to have regularly varying upwardly V-shaped transverse sections along its keel. Rearward of line lug 16, body 12, 13 is hermetically sealed with an upper smoothly varying top shape suggesting a head 19 with an abruptly rising wide frontal surface. The top of the head 19 is transversely in semi-cylindrical form ending in a pair of laterally extending hemispheres which appear prominently as eyes when their larger center pupils 24 are black in color and are surrounded by large white annular bands 25. The transverse section of the head 19 part of the hollow body is shown in FIG. 4.

Back of head 19, body 12, 13 contracts to form a neck 20 having an approximately circular transverse section as shown in FIG. 5.

Rearward from neck 20 body 12, 13 swells for about half its remaining length, then at about the position of numeral 21 it begins to taper down in size and finally tapers abruptly to a substantially pointed tail which not only aids in giving the lure a natural swimming action but also removes any body protuberances which might prevent a striking fish from getting the hook.

Forward from the transversely and vertically extending front of its head 19, body 12, 13 has its keel extend forwardly at a downward angle from line lug 16 to appear like a beak 23 for the imitation live bait lure and also to tip the front of the lure into the water as the line pulls the lure against the relative flow of the water.

With the described lure in the water, with a hook dependent from lug 17, with a line attached to lug 16 and with the line holding the lure against a small water drag, the lure will appear to be a live creature resting buoyantly awash with its head and back slightly out of water. The small water movement will hold the beak down for the water to break slightly against the head to cause the lure to appear to swim slightly and slowly from side to side. If the relative speed of the lure against the water is increased, as when a sharper retrieving motion is given the line, the lure will take a more nearly diving position and a more rapid but laterally restricted swimming motion.

The heavier keel with the more buoyant upper body, with the downward directing forward scoop and the downward rearward drag of the hook removes from the lure any tendency to spin and any necessity for a swivel in the line.

In practice it has been found that with a single small size of the lure of this invention, fish of many species and of a wide range of sizes are being caught. For instance trout less than twelve inches long have been caught casting one of these lures two inches long using a No. 6 triple hook, while a forty pound salmon has been caught trolling the same size lure using a No. 8 triple hook.

Having recited some of the objects of this invention, illustrated and described a preferred form in which the invention may be practiced and explained the use thereof, I claim:

1. A two piece fishing lure made in imitation of the appearance of and to stimulate the action of a conceivable living creature, one of said pieces of said lure being a sealed hollow body having a longitudinally downwardly concave keel along the full length of the body thereof, the other of said pieces being a downwardly concave metal keel strap secured to said keel of said hollow body portion from the front end thereof rearwardly therealong for about two thirds the length of said hollow body, said hollow body having a head end with an abruptly rising transverse front wall followed rearwardly by an axially transverse semi-cylindrical top wall closed at its opposite ends respectively by a pair of hemi-spherical outwardly convex walls, said body extending rearwardly from said head smoothly reduced in girth to simulate a neck then rearwardly smoothly expanded and finally smoothly tapered rearwardly to form a smoothly pointed tail extending rearwardly well beyond the rearward end of said keel strap, said keel strap including at its forward end ahead of said hollow body an upwardly extending line attachment lug, said keel strap including at its rearward end a downwardly extending hook attachment lug and said hollow body ahead of its said abruptly rising front wall having rigidly secured thereto on either side of said line attachment lug of said keel strap a scoop-like beak having its bottom surface formed as a forward continuation of the bottom surface of said downwardly concave keel of said hollow body.

2. A two piece fishing lure made in imitation of the appearance and action of a conceivable living creature, one of said pieces of said lure being a sealed hollow body formed with a longitudinally downwardly concave keel along the full length of the bottom thereof and the other of said pieces being a downwardly concave metal keel strap secured to said keel of said hollow body portion from the front end thereof rearwardly therealong, said keel strap being formed with an upwardly normally extending line attachment lug at the front end thereof and a downwardly normally extending hook attachment lug at the rear end thereof whereby the pulling strain through the lure from said hook lug to said line lug comes entirely on said keel strap, said hollow body portion being formed with a front end head having an abruptly rising transverse front wall and an axially transverse semi-cylindrical top wall closed at its opposite ends respectively by a pair of hemispherical outwardly convex walls, said body being smoothly reduced in thickness rearwardly of said head to simulate a neck then rearwardly smoothly expanded for about one half of its remaining rearward length and finally rearwardly tapered to form a smoothly pointed tail whereby said lure will be gravitationally stable in the water with no tendency to rotate and twist a line to which it may be attached for fishing.

3. The fishing lure of claim 2 in which said lure includes an extension of said keel forward of said hollow body portion and said line attachment lug, said extension being transversely upwardly V-shaped to appear as a scoop-like beak for said lure.

4. The fishing lure of claim 3 in which the laterally extending hemispherical surfaces of said head of said hollow body are centrally colored black to appear like the pupils of eyes and said pupils are surrounded by wide white bands.

References Cited in the file of this patent
UNITED STATES PATENTS

| | | |
|---|---|---|
| D. 111,797 | Stickerath | Oct. 18, 1938 |
| D. 146,488 | Short | Mar. 18, 1947 |
| 1,997,900 | Edwards | Apr. 16, 1935 |
| 2,568,488 | Cummins | Sept. 18, 1951 |
| 2,575,139 | Smith | Nov. 13, 1951 |
| 2,612,716 | Hedland | Oct. 7, 1952 |
| 2,659,175 | Carpenter | Nov. 17, 1953 |
| 2,752,721 | Denny | July 3, 1956 |
| 2,755,592 | Bocchino | July 24, 1956 |
| 2,867,935 | Mearns | Jan. 13, 1959 |